(12) United States Patent
Unwin et al.

(10) Patent No.: US 12,335,343 B2
(45) Date of Patent: Jun. 17, 2025

(54) EDGE CONTROLLER APPARATUS AND CORRESPONDING SYSTEMS, METHOD, AND COMPUTER PROGRAM

(71) Applicant: Yokogawa Electric Corporation, Tokyo (JP)

(72) Inventors: Neil Unwin, Amersfoort (NL); Frank Hurink, Amersfoort (NL)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/346,929

(22) Filed: Jul. 5, 2023

(65) Prior Publication Data

US 2024/0015221 A1    Jan. 11, 2024

(30) Foreign Application Priority Data

Jul. 5, 2022   (EP) .................................... 22183124

(51) Int. Cl.
*H04L 67/12* (2022.01)
*H04L 67/10* (2022.01)

(52) U.S. Cl.
CPC .............. *H04L 67/12* (2013.01); *H04L 67/10* (2013.01)

(58) Field of Classification Search
CPC ......... H04L 41/16; H04L 67/12; H04L 67/10; G16Y 40/10; G06N 3/08; G06N 20/00; G06N 5/04; G06N 3/02; G06N 3/09; G06N 5/022; G06F 11/3447
See application file for complete search history.

(56) References Cited

U.S. PATENT DOCUMENTS

| | | | |
|---|---|---|---|
| 8,081,584 B2 | 12/2011 | Thibault et al. | |
| 9,961,099 B2 | 5/2018 | Singh et al. | |
| 10,635,058 B2 | 4/2020 | Sanders et al. | |
| 11,328,222 B1* | 5/2022 | Matthews | H04L 47/2441 |
| 2018/0184232 A1* | 6/2018 | Maitra | H04L 67/125 |
| 2018/0316555 A1* | 11/2018 | Salgueiro | H04L 67/34 |
| 2019/0042955 A1* | 2/2019 | Cahill | G06N 5/04 |
| 2019/0108747 A1* | 4/2019 | Stenning | G08B 21/187 |

(Continued)

FOREIGN PATENT DOCUMENTS

CN    111538279 A    8/2020

*Primary Examiner* — Tonia L Dollinger
*Assistant Examiner* — Linh T. Nguyen
(74) *Attorney, Agent, or Firm* — 2SPL Patent Attorneys PartG mbB; Yong Beom Hwang (57) ABSTRACT

Examples relate to an edge controller apparatus, to an edge controller method, to an edge controller computer program, and to systems comprising an edge controller apparatus. The edge controller apparatus comprises at least one interface for obtaining status data of a plurality of sensors or actuators and for communicating with a remote server. The edge controller apparatus comprises processing circuitry configured to obtain a plurality of units of status data of the plurality of sensors or actuators, the plurality of sensors or actuators being part of machinery or being arranged in an environment of the machinery. The processing circuitry is configured to update at least one model representing the status of the sensors or actuators based on the plurality of units of status data. The processing circuitry is configured to provide the updated at least one model representing the status of the sensors or actuators to the remote server.

16 Claims, 5 Drawing Sheets

(56) References Cited

U.S. PATENT DOCUMENTS

| | | | | |
|---|---|---|---|---|
| 2019/0138423 | A1* | 5/2019 | Agerstam | G06F 11/3466 |
| 2019/0138908 | A1* | 5/2019 | Bernat | G06N 3/105 |
| 2019/0373081 | A1* | 12/2019 | Jung | H04L 67/125 |
| 2020/0160208 | A1* | 5/2020 | Tan | G05B 19/41855 |
| 2020/0228945 | A1* | 7/2020 | Thon | H04L 67/125 |
| 2020/0327371 | A1* | 10/2020 | Sharma | H04L 67/34 |
| 2021/0397174 | A1* | 12/2021 | Thomsen | G06F 3/0482 |
| 2022/0245829 | A1* | 8/2022 | Yamamoto | G06F 16/7837 |
| 2022/0290090 | A1* | 9/2022 | Ball | C12M 41/26 |
| 2022/0292221 | A1* | 9/2022 | Sohail | H04L 63/105 |
| 2022/0318205 | A1* | 10/2022 | Zhang | G06F 16/1734 |
| 2022/0329657 | A1* | 10/2022 | Velamur | H04L 67/34 |
| 2022/0351744 | A1* | 11/2022 | Krishnan | G06N 3/04 |
| 2023/0100152 | A1* | 3/2023 | Lal | G06N 3/063 |
| | | | | 706/25 |
| 2023/0163002 | A1* | 5/2023 | Han | H01L 21/67253 |
| | | | | 700/109 |
| 2023/0207120 | A1* | 6/2023 | Wu | G06N 3/044 |
| | | | | 705/2 |

* cited by examiner

EDGE CONTROLLER APPARATUS AND CORRESPONDING SYSTEMS, METHOD, AND COMPUTER PROGRAM

FIELD

Examples relate to an edge controller apparatus, to an edge controller method, to an edge controller computer program, and to systems comprising an edge controller apparatus.

BACKGROUND

In industrial plant control applications, in general, field control devices and programmable logic controllers (PLCs) are used connect to industrial plant equipment and run control algorithms for managing industrial devices in the field. These devices have finite but sufficient processing power to measure changes in field parameters and act on them to control the plant's actuators and devices in real-time. These devices are not considered general-purpose devices since they are required to adhere to industrial safety and operational standards. Their functions are dedicated to field communications and process control algorithms. They are generally equipped with a communication protocol interface that allows data from these controllers to be read and written to by independent, general-purpose computers, for application data processing.

These general-purpose computers provide monitoring and supervisory services that read the data from these devices, store and process the data in various ways, such as determining significant changes in field values, process visualization, historical data storage, identifying and managing alarm conditions, sequence of event recording, providing procedural control and calculating aggregated and derivative data.

In the industry, there is a trend towards supporting cloud computing in which the Internet of Things (IoT) and Industrial Internet of Things (IIoT) act as sensor devices to acquire environmental or industrial plant data and provide that data directly to a server in the cloud via the internet. Data processing in this environment usually takes place completely in the cloud.

However, such an approach may have several drawbacks. For example, in such a configuration, the derived data is not readily available at the site of acquisition. Acquired data from the field must first be sent to the cloud before it can be processed. The cloud-based processing may typically generate aggregated and derivative data from the raw acquired data. This data may also be desired for dependent functions at the same location as where the raw data has been acquired, such as for local monitoring or input to other systems in the acquisition domain. In the configuration described above, it has to be retrieved from the cloud environment, which may require a separate interface and processing functions.

Moreover, the reliability of the data generated in the cloud may be a major factor for dependent functions being performed in the same location where that data is being acquired. In particular, the availability of data acquired from the cloud via a separate interface may be sensitive to the reliability of this interface and the network. This reliability may be affected by a number of factors, such as large geographical distances between acquisition and cloud locations requiring more complex network infrastructure, network bandwidth, network latency, security incidents and loss of connections due to material loss of transmission infrastructure. Contingency methods for dealing with these challenges may increase system complexity.

Finally, since data processing takes place in the cloud, there is limited ability to filter acquired data by determining its relevance or significance to cloud functions by the acquisition device. In effect, all data is sent to the cloud to determine its relevance or value. This impacts network bandwidth utilization. As the business model of cloud infrastructure providers often is a utility charge based on the numbers of messages (or amount of data) being transferred or processed, this may directly affect the running costs.

There may be a desire for an improved concept for handling data in industrial plant control applications.

SUMMARY

This desire is addressed by the subject-matter of the independent claims.

Various examples of the present disclosure are based on the finding, that an entirely cloud-based processing of processing plant data has several drawbacks, which may impede the use of the processed data at the industrial plant. In addition to the above-mentioned drawbacks, through the transmission of raw data from the sensors or actuators to the cloud-based processing facility, the context of the data being processed in the cloud is lost and has to be reconstructed by the cloud-based processing entity. In the following, an edge-based concept is proposed, providing an edge device for operational processing and industrial process control. In the proposed concept, the data, further denoted "status data" of the sensors and/or actuators of machinery (e.g., of a processing plant or production plant) is processed by an edge controller apparatus, which merges the respective units of status data of the actuators and/or sensors into at least one model, which is (continuously) updated and provided to a remote (cloud) server for further processing. By performing an initial processing of the status data at the edge processing device (which is located near the machinery), both local processing can be performed that can be fed back to the controllers of the machinery without incurring the drawbacks listed above, and the data can be provided to the remote server in a more useful manner, as multiple units of status data can be combined to provide the respective status data with additional context, which can facilitate subsequent processing by the remote (cloud) server.

Some aspects of the present disclosure relate to an edge controller apparatus. The edge controller apparatus comprises at least one interface for obtaining status data of a plurality of sensors or actuators and for communicating with a remote server. The edge controller apparatus comprises processing circuitry configured to obtain a plurality of units of status data of the plurality of sensors or actuators. The plurality of sensors or actuators are part of machinery or are arranged in an environment of the machinery. The processing circuitry is configured to update at least one model representing the status of the sensors or actuators based on the plurality of units of status data. The processing circuitry is configured to provide the updated at least one model representing the status of the sensors or actuators to the remote server. By maintaining, updating, and providing the model to the remote server, the data of the sensors/actuators can be provided to the remote server in a more meaningful manner, thus requiring less effort for reconstructing the context between the different units of status data at the remote server. In addition, some amount of local processing can be performed by the edge controller apparatus, which may overcome the drawbacks listed above.

In particular, the proposed edge controller apparatus may be used to "contextualize" the status data, i.e., to provide the status data in a manner that also includes the context of the status data, such as other unit(s) of status data or information on where the respective sensor/actor is being located. Accordingly, the processing circuitry may be configured to include contextual information in the at least one model by updating each model based on at least two units of status data. Alternatively, or additionally, the processing circuitry may be configured to include contextual information in the at least one model by updating each model based on at least one unit of status data if the respective model comprises contextual information on the sensor or actuator the at least one unit of status data originates from.

It is evident, that at least two approaches can be used to "contextualize" the status data—to add additional status data that puts the respective unit of status data in context, or to add ancillary information that characterizes the sensor or actuator the respective unit of status data originates from. In the first case, if the model is updated based on at least two units of status data, the contextual information may be based on one of the at least two units of status data. For example, the status data being used to provide the context may be used, by the remote server, to evaluate the status data being put into context. To give an example, status data representing the temperature measured by a temperature sensor of a motor of the machinery may be put into context by status data representing the number of revolutions of the motor, or status data representing the pressure in a hydraulic system may be put into context by status data representing the action being performed using the hydraulic system.

In the second case, i.e., where ancillary information that characterizes the sensor or actuator the respective unit of status data originates from is added, various points of information may be included in the mode. For example, the contextual information may comprise at least one of location information on the sensor or actuator the respective unit of status data originates from, information on a piece of machinery comprising the sensor or actuator the respective unit of status data originates from, information on a sensor type or actuator type of the sensor or actuator the respective unit of status data originates from. Such information may be used, by the remote server, to interpret the status data, e.g., to enable plausibility checks, cross-checks with status data of other actors/sensors nearby, or further processing that takes into account known non-linearities of the respective sensor or actuator. Additionally, or alternatively, as outlined in connection with the first case, the contextual information may comprise status data of another sensor or actuator putting the status data of the sensor or actuator represented by the respective model into context.

In some cases, additional status data may also be used for the at least one model. For example, machinery is often influenced by outside conditions, such as ambient temperature or humidity, seismic activity, or sunlight incident to the machinery. Such outside conditions may be measured by one or more additional sensors, which may be located outside the environment of the machinery. Accordingly, the processing circuitry may be configured to obtain a subset of the plurality of units of status data from one or more additional sensors. Thus, such outside conditions may be taken into account while processing the status data included in the model at the remote server.

One major upside of using an edge controller apparatus, instead of forwarding the status data entirely to the remote server, is the ability to perform local processing or pre-processing before the respective status data is included in the at least one model. For example, the processing circuitry may be configured to pre-process the units of status data, and to update the at least one model based on the pre-processed status data. In particular, the pre-processing may be used at least for one or more of the following purposes—to convert the status data into a format that can easily be processed by the remote server and is thus mandated by the model (i.e., normalization), to change an update frequency of the respective status data to an update frequency desired by the remote server and thus mandated by the model, and to generate aggregated status data. All of these pre-processing tasks can facilitate the processing of the status data included in the model by the remote server. In addition, these pre-processing tasks may also be used to generate values that are fed back to control devices of the machinery.

For example, the edge controller apparatus may perform data normalization on the units of status data. The processing circuitry may be configured to normalize the status data by converting the status data into a pre-defined data format mandated by the respective model. In particular, the pre-defined data format mandated by the respective model may be a sensor-agnostic data format or an actuator-agnostic data format. Thus, the respective status data may be processed by the remote server without taking into account the different output formats by the respective sensors and/or actuators that are used as part of the machinery or that are used to quantify the aforementioned outside conditions.

Additionally, or alternatively, the update frequency may be adjusted to a desired update frequency. The processing circuitry may be configured to update the at least one model based on an update frequency mandated by the respective model, with the update frequency being independent of an update frequency of the respective units of sensor data. For example, the update frequency may be synchronized across sensors and/or actuators contributing status data to a model, or adapted to the requirements of the remote server, e.g., to avoid providing updates that differ only with respect to one unit of status data, or to avoid providing updates that are not required by the remote server, thus reducing the communication and processing overhead at both the edge controller apparatus and the remote server.

As outlined above, data aggregation is a third pre-processing task that can be performed by the edge controller apparatus. For example, the processing circuitry may be configured to aggregate status data of the same sensor and/or actuator over multiple points in time and to update the at least one model based on the aggregated status data. Thus, useful derived status data, such as sums, averages, means, maximal values or minimal values may be calculated by the remote server.

The data aggregation listed above may be considered a pre-processing task. In addition, however, such data aggregation, e.g., with additional processing such as calculating (windowed) sums, averages, means, maximal values or minimal values may also be considered "derived data", i.e., status data that is derived from the units of status data provided by the respective sensors and/or actuators that goes beyond a simple quantization, conversion, or aggregation. In addition, derived data may be derived from status data of more than one sensor and/or actuator. Accordingly, the processing circuitry may be configured to calculate derived data from the plurality of units of status data, and to include the derived data in the at least one model. Such derived data may also be fed back to a control device of the machinery.

Another task that can be performed by the edge controller apparatus relates to the quality, plausibility, reliability, or usefulness of the respective units of status data. For example, sometimes, units of status data may be obtained that are clearly erroneous, e.g., as a cyclic redundancy check indicates corruption of the unit of status data, or as the unit of status data comprises status data outside a defined range of valid status data. Accordingly, the processing circuitry may be configured to validate the units of status data, and to update the at least one model based on the validated units of status data. Additionally, or alternatively, status data may arrive too late to be relevant, e.g., as multiple units of status data are delayed due to network congestion or due to a malfunctioning scheduler of a control device being used to read out the respective status data. In some other cases, not each unit of status data may be deemed relevant, e.g., as some units of status data only indicate that nothing has changed or happened. Accordingly, the processing circuitry may be configured to filter out irrelevant units of status data based on a relevancy criterion, and to update the at least one model based on the remaining units of status data. Both measures may improve the quality of the status data contained in the updated at least one model, while reducing the communication and processing overhead at least on the side of the remote server.

In the aforementioned examples, the units of status data have been defined with respect to the sensors and/or actuators providing the status data. In some cases, the respective sensors and/or actuators may be coupled to, read out by, provide their respective unit of status data to and/or controlled by the edge controller apparatus directly. In many cases, however, at least some of the sensors are connected to control devices, such as field control devices and/or programmable logic controllers, which read out or receive the status data from the respective sensor(s) or actuator(s) and forward it to the edge controller apparatus. Accordingly, the processing circuitry may be configured to obtain the respective status data from one or more control devices being coupled with the respective sensors or actuators. For example, a subset of the units of status data may be obtained from the one or more control devices, with another subset being obtained directly from the respective sensor(s) and/or actuator(s).

Such a control device may be configured to, as the name indicates, control an aspect of the machinery, e.g., by executing a control loop on the status data of the respective sensors coupled with the control device (and optionally on status data or derived status data provided by the edge controller apparatus). For example, the remote server may provide instructions for controlling the one or more control devices, which may be forwarded by the edge controller apparatus. The processing circuitry may be configured to obtain instructions for controlling the one or more control devices from the remote server in response to the updated at least one model, and to control the one or more control devices based on the instructions obtained in response to the updated at least one model. For example, status data analysis performed by the remote server, which may have access to a wide range of status data from a multitude of sensor and/or actuators, may be used as input for a control loop being run by a control device. Alternatively, the edge controller apparatus may be configured to perform the status data analysis, e.g., to provide instructions with a lower delay compared to the remote server. In various examples, the processing circuitry may be configured to process the updated at least one model locally at the edge controller apparatus, and to control the one or more control devices based on the local processing of the updated at least one model being performed by the edge controller apparatus.

The at least one model might not only be of interest at the remote server. In addition, it may be used to provide real-time information for operators operating the machinery. Accordingly, a (graphical) representation of the at least one model may be output via a user interface, e.g., so the operator of the respective machinery can obtain an overview of the status of the machinery locally, without requiring the respective data to be sent back and forth between the processing or production plant comprising the machinery and the remote server. For example, the processing circuitry may be configured to provide a user interface via the at least one interface, the user interface comprising a representation of the at least one model.

The granularity of the model or models may be chosen according to the requirements of the application. In some cases, it may be beneficial to maintain and update a large model representing the entire machinery, while some cases benefit from maintaining and updating smaller models each representing a single actuator or sensor. Accordingly, the processing circuitry may be configured to update at least one model representing the status of a piece of machinery and of the sensors and/or actuators. Alternatively, the processing circuitry may be configured to update a plurality of models each representing the status of a sensor or actuator. Maintaining and updating a large model has the benefit of including more context, thus facilitating the processing of the model at the remote server, at the cost of a larger size of the model. Smaller models have the benefit of a smaller size, and also the benefit of being able to update different units of status data independently off each other without causing retransmission of a larger model.

In the present application, the term "model" is used to describe an abstraction of status data. In this context, a model is a pre-defined data format that is filled with different values, e.g., multiple units of status data (and derived data), or unit(s) of status data and contextual information (and derived data). For example, in the present context, the model might not be a machine-learning model, i.e., a model being suitable for performing inference on, but a model comprising a structured representation of the status data. For example, the model may correspond to a pre-defined (e.g., fixed), structured description (of components of the machinery and their respective status data) and hierarchy of relationships (between components of the machinery and/or between units of status data. The model may be defined as part of engineering and not inferred through AI. For example, the model may comprise "tags" defining the values contained within the model, or the values may be defined by their position within the model. In particular, the at least one model may be provided as an object suitable for use in an object-oriented data processing facility (e.g., according to an object notation format that can be read by the respective object-oriented data processing facility). For example, the at least one model may be based on the OPC Unified Architecture, which is an architecture being used in the context of industrial process control.

Similarly, as the edge controller apparatus is defined in the context of machinery, and, in particular, industrial process control, the edge controller apparatus may be a controller of a Supervisory Control And Data Acquisition (SCADA) industrial control system.

Some additional aspects of the present disclosure relate to the use of multiple edge controller apparatuses alongside each other, e.g., for the purpose of redundancy or failover, or for the purpose of forwarding status data between edge controller apparatuses. Accordingly, an aspect of the present disclosure relates to a system comprising two or more edge controller apparatuses as defined above.

In some examples, one of the two or more edge controllers operates as a redundant copy of another of the two of more edge controllers. Thus, in case of failure of one of the edge controller apparatuses, or when one of the edge controller apparatuses needs to be updated with new software/firmware, the other edge controller apparatus can take over.

Additionally, or alternatively, the edge controller apparatuses may pass (pre-processed) units of status data or derived data among each other, e.g., so that each unit of status data is (primarily) only associated with one of the edge controller apparatuses (except with respect to redundancy). Accordingly, the processing circuitry of a first of the two or more edge controllers may be configured to obtain a subset of the plurality of units of status data via a second of the two or more edge controllers.

Some aspects of the present disclosure relate to a corresponding edge controller method. The edge controller method comprises obtaining a plurality of units of status data of a plurality of sensors or actuators. The plurality of sensors or actuators are part of machinery or are arranged in an environment of the machinery. The edge controller method comprises updating at least one model representing the status of the sensors or actuators based on the plurality of units of status data. The edge controller method comprises providing the updated at least one model representing the status of the sensors or actuators to a remote server.

Another aspect of the present disclosure relates to a corresponding computer program having a program code for performing the above method, when the computer program is executed on a computer, a processor, or a programmable hardware component.

BRIEF DESCRIPTION OF THE FIGURES

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 1A:
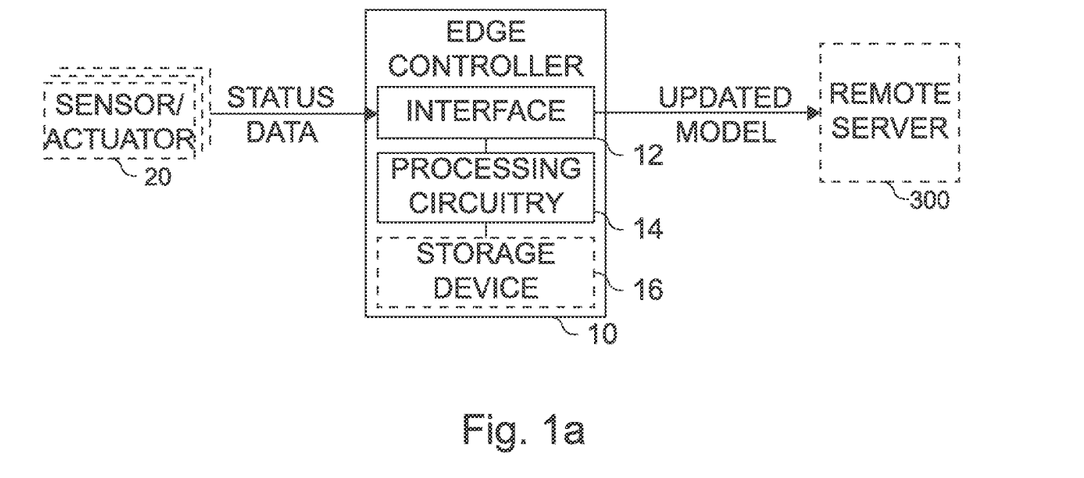
FIG. 1a shows a block diagram of an example of an edge controller apparatus, and of a system comprising the edge controller apparatus.

FIG. 1a shows a block diagram of an example of an edge controller apparatus 10. The edge controller apparatus 10 comprises at least one interface 12, processing circuitry 14 and an optional storage device 16. The processing circuitry 14 is coupled with the at least one interface 12 and with the optional storage device 16. In general, the functionality of the edge controller apparatus 10 is provided by the processing circuitry 14, in conjunction with the at least one interface 12 (for exchanging data, e.g., with a plurality of sensors and/or actuators 20 and/or with a remote server 300 further shown in FIG. 1a) and/or with the storage device 16 (for storing and/or retrieving information).

The processing circuitry 14 is configured to obtain the plurality of units of status data of the plurality of sensors or actuators (and, optionally, of the one or more additional sensors). The processing circuitry 14 is configured to update at least one model representing the status of the sensors or actuators based on the plurality of units of status data. The processing circuitry 14 is configured to provide the updated at least one model representing the status of the sensors or actuators to the remote server 300.

As shown in FIG. 1a, the edge controller apparatus 10 is coupled (at least indirectly) with the plurality of sensors and/or actuators 20 and/or with the remote server 300. In the proposed concept acts as an intermediary between the sensors and/or actuators 20 and the remote server 300. In particular, the processing circuitry 14 of the edge controller apparatus 10 is configured to obtain a plurality of units of status data of the plurality of sensors and/or actuators. However, the edge controller apparatus does not necessarily communicate directly with the sensors and/or actuators. In some cases, the processing circuitry may be configured to obtain (e.g., read out or receive) at least a subset of the plurality of units of status data directly from the respective sensors and/or actuators 20 (via the at least one interface 12). In some other cases, as shown in FIG. 1c, the processing circuitry 14 may be configured to obtain (e.g., receive or read out) at least a subset of the plurality of units of status data of the respective sensors and/or actuators 20 from one or more control devices 24 coupled with the respective sensors and/or actuators 20 (via the at least one interface 12). For example, the processing circuitry may be configured to obtain the respective status data (e.g., a subset of the plurality of units of status data) from the one or more control devices being coupled with the respective sensors or actuators. For example, a mixed scenario may be possible, where a first subset of the plurality of units of status data is obtained directly from the respective sensors and/or actuators 20 and a second subset of the plurality of units of status data is obtained from the one or more control devices 24.

The plurality of sensors and/or actuators 20 mentioned above are sensors or actuators that are part of machinery or being arranged in an environment of the machinery. For example, the plurality of sensors and/or actuators 20 may be sensors and/or actuators for use in an industrial application. For example, the plurality of sensors and/or actuators may comprise one or more sensors of the group of a temperature sensor, a pressure sensor, a flow meter, a vibration sensor, or any entity that can perform and/or transmit a measurement. In this context, a sensor may be any instrument that is configured to react to a physical condition, and that is configured to provide information representing said physical condition. For example, the plurality of sensors and/or actuators may comprise one or more actuators of the group of a relay circuit and a signal converter for converting a digital signal (comprising control information) or a low-voltage signal into a (strong) driver signal for driving a mechanical device, such as a valve, pump, or compressor. In more general terms, an actuator may be a servomechanism for providing a measured amount of energy or control for the operation of another mechanism or system. For example, the plurality of sensors and/or actuators may be wireless sensors and/or actuators and/or wired sensors and/or actuators, or a mix of both. In particular, the plurality of sensors and/or actuators 20 mentioned above may be sensors or actuators that are part of machinery or being arranged in an environment of machinery of an industrial (processing) plant. In other words, the plurality of sensors and/or actuators 20 may either be included in the machinery or be arranged in (direct) proximity of the machinery, in order to represent the status of the machinery. In effect, units of status data obtained from the plurality of sensors and/or actuators 20 may represent the status of the machinery. For example, sensors and/or actuators of the plurality of sensors and/or actuators 20 that are not included in the machinery may be arranged in proximity to the machinery, in order to generate and provide status data that specifically represents the status of the machinery. For example, sensors and/or actuators of the plurality of sensors and/or actuators 20 that are not included in the machinery may be arranged in the same room, or same building, as the machinery. For example, sensors and/or actuators of the plurality of sensors and/or actuators 20 that are not included in the machinery may be arranged in a pre-defined radius around the machinery, e.g., in a pre-defined radius where the status data provided by the respective sensor and/or actuator primarily reflects the status of the machinery.

The plurality of sensors and/or actuators are part of machinery or being arranged in an environment of the machinery. In general, such machinery may be any mechanical component, and in particular electro-mechanical component, that is part of an industrial process, e.g., a machine that is used in factory, such as a processing plant or production plant. Examples of machinery include an electrolyzer, a reactor, machinery for steam production, machinery for steam injection, and safety systems for such machinery (e.g., to initiate a shutdown of the machinery in case of malfunction). The machinery may be part of a processing plant, i.e., a factory for processing raw materials, such as a refinery, or of a production plant, i.e., a factory for producing goods, such as a pharmaceutical production plant. Such a processing plant or production plant may be a combination of machinery components that are used together for a processing task or production task.

In addition to these sensors and/or actuators 20, additional sensors may also be used to provide status data. For example, as further shown in FIG. 1c, the processing circuitry 14 may be configured to obtain a subset of the plurality of units of status data from one or more additional sensors 22, which may be ambient sensors, or more generally sensors for measuring outside conditions, such as ambient temperature, ambient humidity, seismic activity etc. For example, the one or more additional sensors 22 may be sensors that are not primarily influenced by the machinery, but which measure ambient data or outside conditions. The subset of the plurality of units of status data from the one or more additional sensors 22 may be obtained similar to the units of status data that are obtained from the plurality of sensors and/or actuators 20, e.g., directly from the one or more additional sensors or via a control device. FIG. 1c shows a block diagram of another example of the edge controller apparatus, and of a system comprising the edge controller apparatus.

Figure 1B:
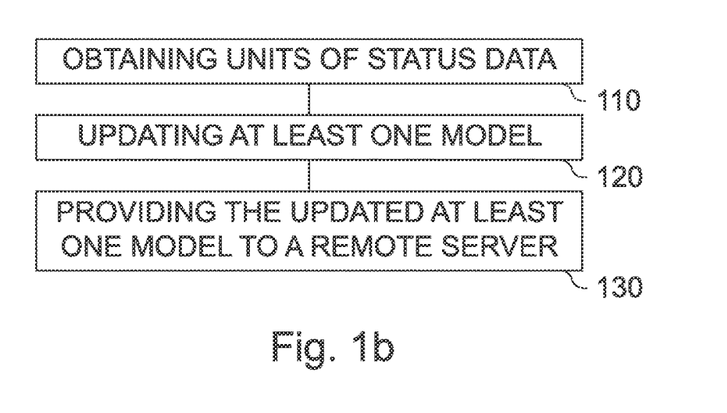
FIG. 1b shows a flow chart of an example of an edge controller method.
Figure 1C:
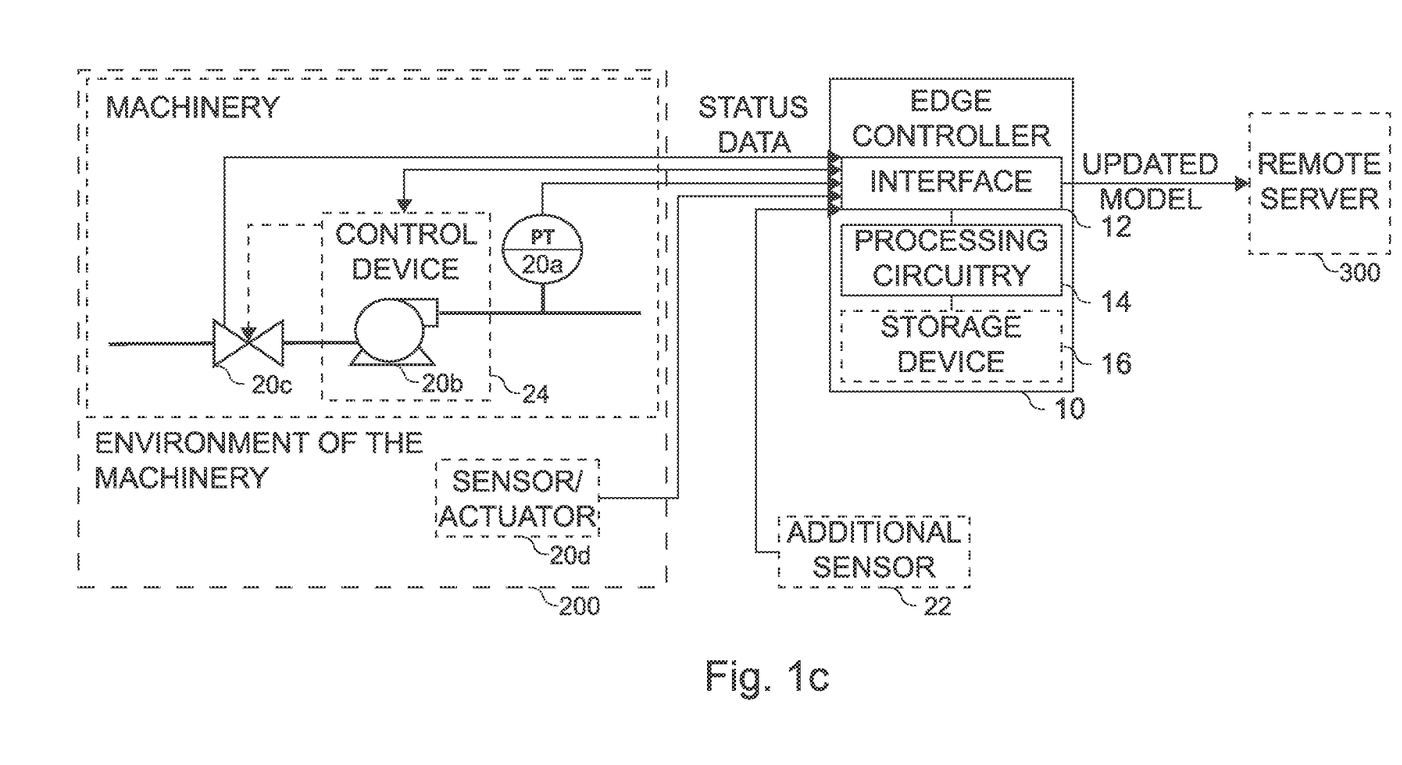
FIG. 1c shows a block diagram of another example of an edge controller apparatus, and of a system comprising the edge controller apparatus.
Figure 1D:
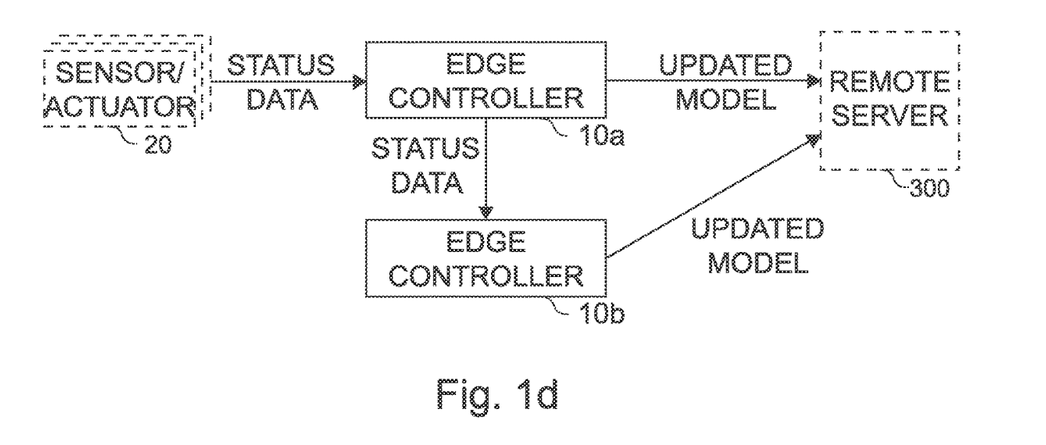
FIGS. 1d and 1e show block diagrams of systems comprising two or more edge controller apparatuses.
Figure 1E:
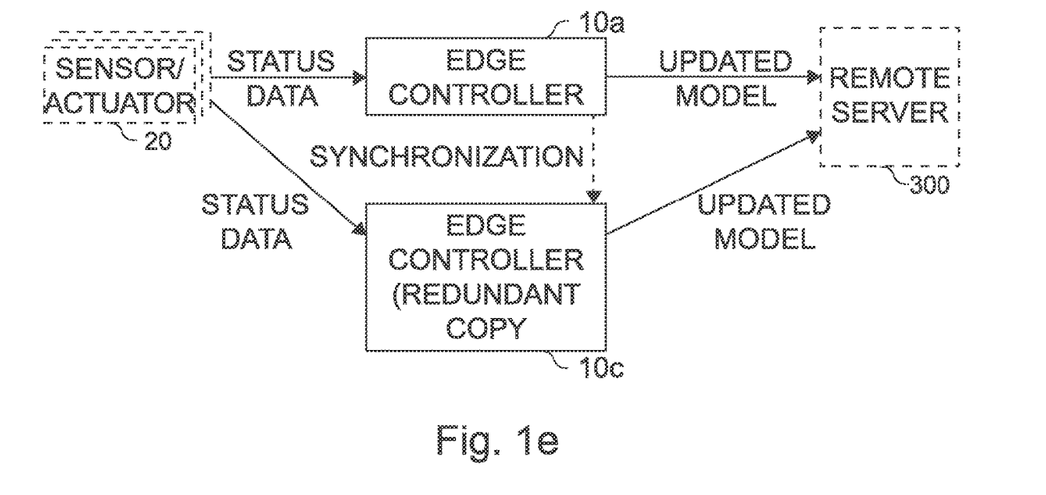

As shown in FIGS. 1d and 1e, in addition to the sensors and/or actuators 20; 22 and the control devices 24, the at least one interface 12 may be suitable for, e.g., configured to, communicating/communicate with other edge controller apparatuses 10.

In general, the communication between the respective entities may be based on established standards, such as Ethernet (for local communication and towards a gateway) and/or the internet (for communicating with the remote server 300). Alternatively, proprietary communication protocols may be employed. In additional, at least the communication between the edge controller apparatus (or the aforementioned gateway) and the remote server may be conducted via an (encrypted) communication tunnel, such as a virtual private network (VPN).

FIGS. 1a and 1c further show examples of systems comprising the edge controller apparatus 10, e.g., a system comprising the edge controller apparatus 10 and the plurality of sensors and/or actuators 10 and/or a system comprising the edge controller apparatus 10 and the remote server 300. In addition, the respective systems may comprise the respective other components, such as the one or more additional sensors 22, the one or more control devices 24, and the remote server 300 or sensors and/or actuators 20 that are previously not part of the respective systems.

FIG. 1b shows a flow chart of an example of a corresponding edge controller method. The edge controller method comprises obtaining 110 the plurality of units of status data of the plurality of sensors or actuators. The plurality of sensors or actuators are part of machinery or are arranged in an environment of the machinery. The method comprises updating 120 the at least one model representing the status of the sensors or actuators based on the plurality of units of status data. The method comprises providing 130 the updated at least one model representing the status of the sensors or actuators to the remote server.

In the following, the edge controller apparatus 10, the corresponding edge controller method, a corresponding edge controller computer program and the respective systems are introduced in more detail with respect to the edge controller apparatus 10 and systems. Features introduced with respect to the edge controller apparatus 10 and/or one of the systems may likewise be included in the corresponding edge controller method and computer program.

As is evident, the proposed concept is centered around the edge controller apparatus 10 (short "edge controller") introduced in connection with FIGS. 1a and 1c. This edge controller apparatus is an intermediary between the sensors and/or actuators that are local to an industrial plant (with the sensors and/or actuators being part of the machinery of the industrial plant, being arranged in an environment of the machinery, or being configured to measure ambient data or outside conditions that can have an influence on the machinery) and the remote server. In particular, the edge controller apparatus may be arranged at the edge of the industrial plant and may thus be part of the industrial plant. Accordingly, the communication between the edge controller apparatus and the sensors and/or actuators (or the one or more control devices) occurs locally at the processing or production plant, e.g., according to established communication protocols for communication within industrial plant. In particular, the communication between the edge controller apparatus and the one or more control devices may be according to the industry standard Supervisory Control And Data Acquisition (SCADA), which defines industry standard communication procedures for data acquisition, which may be implemented using different protocols. Accordingly, the edge controller apparatus may be a controller of a SCADA industrial control system. The SCADA industrial control system may further comprise the one or more control devices. For example, the one or more control devices may be one or more field control devices and/or programmable logic controllers, which may be part of the SCADA industrial control system. In other words, data acquisition and/or control of the one or more control devices may be performed via the mechanisms provided within the SCADA industrial control system. The at least one model may, on the other hand, be based on another standard being used in industrial plants—the OPC Unified standard. In other words, the at least one model may be based on the OPC Unified Architecture.

One purpose of the edge controller apparatus is the acquisition of status data of the sensors and/or actuators (including, optionally, the one or more additional sensors), and the maintenance and update of the at least one model based on the acquired status data. For this purpose, the plurality of units of status data is acquired from various sources, which have been outlined above. In this context, the term "unit(s) of status data" is used to separate measurements or values provided by the respective sensors and/or actuators. For example, the unit(s) of status data may also be denoted sample(s) of status data, status data value(s) or packets of status data. A unit of status data may refer to a single measurement or actuator value, or to a group of measurements or actuator values generated and/or obtained at the same point in time.

In the present context, the term "status data" (which is denoted "data" in connection with FIGS. 2a and 2b) is used for both the data obtained from sensors and actuators. With respect to the sensors, the status data may be measurement data or sensor data. With respect to the actuators, the status data may represent a state or a control setting that influences the action of the respective actuator. For example, if the actuator is a pump, the status data may be a flow throughput the pump is set to. If the actuator is a motor, the status data may be the number of revolutions per minute the motor is set to, or the voltage or current being used to control the revolutions per minute etc.

In addition, the units of status data may be (pre-)processed in various ways. In the following, three types of processing are introduced, of which one or more may be applied on the units of status data—data pre-processing (such as data normalization or data aggregation), data contextualization, and determination of derivative data.

In various examples, the edge controller apparatus is configured to pre-process the acquired status data. In general, pre-processing may be a processing task where the raw status data is prepared for further processing by a more complex processing task. For example, pre-processing may comprise tasks such as data quantization (i.e., determining a digital value from an analog measurement), data normalization or data aggregation. The pre-processing task of data normalization has the purpose of converting the acquired units of status data into a format that is understood (or that can be processed more easily) by the remote server. Accordingly, the processing circuitry may be configured to pre-process the units of status data, and to update the at least one model based on the pre-processed status data. As outlined above, the units of status data may be converted into a format that is understood or that can be easily processed by the remote server. Details on such a data format may be codified (e.g., defined, or mandated) by the at least one model. In other words, the at least one model may specify a mandatory data format for the status data included in the respective model. For example, each model may comprise a plurality of entries of status data (such as raw status data, normalized status data, and derived data) or contextual information (which will be introduced at a later stage). For each of the entries, a pre-defined data format may be mandated by the respective model. For example, the at least one model may specify one or more of a data type (such as integer, float, double, Boolean, enumeration, string etc.) of the status data, a range of values (of maximal or minimal values, or an enumeration of allowable values) of the status data, a precision of values of the status data, an invalid default value for missing status data, and an update frequency of the status data included in the respective model. For example, one or more of the criteria data type, range of values, precision of values, invalid default value and update frequency may define the pre-defined data format of the respective status data. The processing circuitry may be configured to normalize the status data by converting (e.g., translating) the status data into the pre-defined data format mandated by the respective model. As the pre-defined data format is mandated by the respective model, it is, in many cases, independent of the sensor or actuator hardware being used to generate the respective units of status data. In other words, the pre-defined data format mandated by the respective model may be a sensor-agnostic data format or an actuator-agnostic data format, i.e., a data format that does not correspond to the raw status data obtained from the respective sensor and/or actuator, but to a data format that is pre-defined independent of the sensor or actuator being used, e.g., by the model.

As outlined above, one of the criteria of the pre-defined data format may be the update frequency. In this context, the term "update frequency" defines how often (i.e., in which temporal succession) the respective status data is to be updated within the model. In some examples, the update frequency may be defined for the entire model. In some other examples, the update frequency may be defined on a per-entry-of-status-data basis, i.e., separately for each entry of the model. For example, the update frequency may be independent of an update frequency of the respective units of sensor data. The processing circuitry may be configured to update the at least one model based on an update frequency mandated by the respective model. For example, the processing circuitry may be configured to discard units of status data if the update frequency of the sensor or actuator providing the unit of status data is higher than the update frequency mandated by the respective model. If the update frequency of the sensor or actuator providing the unit of status data is lower than the update frequency mandated by the respective model, the processing circuitry may be configured to interpolate between subsequent units of status data, or to repeatedly use the previously received unit of status data when updating the respective model. If the update frequency mandated by the model corresponding to the update frequency of the sensor or actuator providing the unit of status data, no adjustment might be required.

Data aggregation may be a third pre-processing task. In the present context, the term "data aggregation" may be used to refer to the process of aggregation of status data (i.e., collecting multiple units of status data taken from multiple points in time). For example, the pre-processing of the status data may comprise storing, for at least a subset of sensors and/or actuators, multiple units of status data obtained over a plurality of points in time. Further processing may be applied on the aggregated status data, e.g., in order to calculate derived data from the aggregated status data.

Data contextualization is a second processing tasks that can be performed by the edge controller apparatus. In this context, data contextualization means that the status data included in the respective model is put into context, by including further status data in the model that put the status data into context (first approach), and/or by including contextual information on the sensor (such as its sensor type, location etc.) in the model (second approach). In other words, the processing circuitry may be configured to include contextual information in the at least one model, by updating each model based on at least two units of status data (first approach), or by updating each model based on at least one unit of status data if the respective model comprises contextual information on the sensor or actuator the at least one unit of status data originates from (second approach). In various examples, both approaches may be used at the same time.

In the first approach, the "main" unit of status data being represented by the model (e.g., a temperature value of a temperature sensor that is part of the machinery, or a power consumption of a motor) is being put into context by another unit of status data (e.g., an ambient temperature, or a load being moved by the motor, respectively). Accordingly, if the model is updated based on at least two units of status data, the contextual information may be based on one of the at least two units of status data. In other words, the contextual information may comprise status data of another sensor or actuator putting the status data of the sensor or actuator represented by the respective model into context.

In the second approach, ancillary information on the sensor or actuator providing the respective unit of status data is included as part of the respective model. For example, the contextual information may comprise at least one of location information on the sensor or actuator the respective unit of status data originates from, information on a piece of machinery comprising the sensor or actuator the respective unit of status data originates from, and information on a sensor type or actuator type of the sensor or actuator the respective unit of status data originates from. Such information may then be used, by the remote server, to put the status data represented by the at least one model into context.

Above, the term "the status data of the sensor or actuator represented by the respective model" was used. In the proposed concept, two types of models are supported—models that represent a single sensor or actuator, and models that represent the entire industrial plant or machinery. For example, the processing circuitry may be configured to update a plurality of models each representing the status of a (single) sensor or actuator. Alternatively, or additionally, the processing circuitry may be configured to update at least one model representing the status of a piece of machinery and of the sensors and/or actuators (that are part of the machinery and/or arranged in the environment of the machinery). In general, both types of models may be used, e.g., either the one or the other, or both at the same time. In the former case, the status data of the sensor or actuator represented by the respective model refers to the status data provided by the single sensor or actuator being represented by the model. In the latter case, the model may represent multiple sensors and/or actuators, such that the status data included in the model can be used to (mutually) put other status data also included in the model into context.

A third data processing task relates to the determination of derivative data. In the determination of derivative data, the units of status data are analyzed, and derivative data is generated that is derived from the units of status data, beyond a simple pre-processing or normalization of the status data. The processing circuitry may be configured to calculate derived data from the plurality of units of status data, and to include the derived data in the at least one model. For example, the processing circuitry may be configured to evaluate the plurality of units of status data with respect to one or more pre-defined alarm conditions and/or one or more pre-defined anomaly conditions, to determine an alarm condition or an anomaly condition based on the one or more pre-defined alarm conditions or one or more pre-defined anomaly conditions, and to include information on an alarm condition or anomaly condition in the at least one model (as derived data). Additionally, or alternatively, the processing circuitry may be configured to calculate one or more values that are each based on two or more units of status data (e.g., a ratio, difference or sum of two or more values included in the two or more units of status data), and to include the calculated values as derived data in the at least one model. A third type of derived data relates to the aggregation of data. For example, the processing circuitry may be configured to aggregate status data of the same sensor and/or actuator over multiple points in time, and to update the at least one model based on the aggregated status data. For example, the processing circuitry may be configured to calculate one or more of a (moving) average or mean (e.g., over a moving time window), a minimal value (e.g., over a moving time window), a maximal value (e.g., over a moving time window), a sum (e.g., over a moving time window) of the status data of the same sensor or actuator that is aggregated over the multiple points in time, or of derived data from multiple sensors and/or actuators that is aggregated over the multiple points in time. For example, the aggregated status data may be used to determine an anomaly or alarm condition (indicating an alarm to be raised with respect to the machinery or an anomaly being detected within the status data representing the machinery). For example, one or more pre-defined alarm conditions and/or one or more pre-defined anomaly conditions or a suitably trained machine-learning model may be used for this purpose.

Two further data processing tasks that can be performed by the edge controller apparatus are targeted at improving the quality of the status data included in the at least one model—data validation, and filtering of irrelevant status data. Data validation relates to the task of identifying invalid units of status data, such as units of status data that are corrupted (e.g., due to bit errors), units of status data that are invalid (due to the value of the status data being outside an allowable range of values), and/or units of status data that have become invalid due to a delay (e.g., as they are superseded by a newer unit of status data). The processing circuitry may be configured to validate the units of status data, and to update the at least one model based on the validated units of status data. For example, the processing circuitry may be configured to validate the units of status data by checking the units of status data with respect to (bit) corruption (e.g., using check information or redundancy information such as a cyclic redundancy check), by checking the units of status data with respect to a range of valid values (e.g., as defined by the respective model being used or as defined with respect to the sensor or actuator the unit of status data originates from), and/or by checking a timestamp of the units of status data (e.g., by checking whether a time interval elapsed since the time stamp is too long or by checking whether the unit of status data has been superseded by a subsequent unit of status data).

Irrelevant units of status data may be identified based on a relevancy criterion, such as the aforementioned update frequency or information which status data is included in the at least one model (to identify units of status data not required in any of the model(s) being updated). The processing circuitry may be configured to filter out (e.g., discard) irrelevant units of status data based on the relevancy criterion, and to update the at least one model based on the remaining units of status data. Another relevancy criterion may be the difference between status data currently included in the at least one model and the status data newly obtained as part of the units of status data—if the difference is smaller than a threshold, an update of the status data included in the at least one model may be foregone.

The at least one model is updated based on the various (pre-processed) units of status data and contextual information outlined above. To avoid re-generating the at least one model for each update, the at least one model may be generated once and then maintained by the processing circuitry. In other words, the processing circuitry may be configured to update the at least one model by adapting a previously generated at least one model (being maintained by the processing circuitry). Alternatively, the at least one model may be updated by re-generating the at least one model (from scratch) for every update.

Once the model is updated (e.g., after each update of the at least one model, or according to an update frequency mandated by the at least one model), it is provided (e.g., transmitted) to the remote server. In other words, the processing circuitry is configured to provide the updated at least one model representing the status of the sensors or actuators to the remote server. For example, the at least one model may be provided to the remote server via a computer network, such as the internet, e.g., through a communication tunnel/VPN. For example, the processing circuitry may be configured to provide the at least one model to the remote server via a gateway, with the gateway being connected to the remote server via the internet (and, optionally, a communication tunnel/VPN).

There are various options for providing the updated at least one model. In some examples, the entire at least one model may be provided to the remote server. In other words, the processing circuitry may be configured to provide the entire at least one model to the remote server, e.g., upon each update or according to the update frequency mandated by the respective model. For larger models, such as models comprising the entire industrial plant (e.g., as shown in FIG. 2b), a sparse (i.e., incremental) version of the at least one model may be transmitted. For example, the processing circuitry may be configured to provide a sparse or incremental version (e.g., a version comprising only updated status data) of the updated at least one model to the remote server. Status data that remains unchanged (or that has changed by less than a pre-defined threshold) may be excluded from the sparse or incremental version. Both the "full" model(s) and the sparse/incremental model(s) may be generated in a format that can easily be processed by the remote server. For example, the at least one model (e.g., as full version or sparse/incremental version) may be provided as an object suitable for use in an object-oriented data processing facility. For example, the at least one model may be provided as a serialized object, in object notation, such as the JSON (Java-Script Object Notation), or as a text file (e.g., XML (eXtensible Markup Language) file) with tags denoting the status data and/or contextual data included in the at least one file.

As outlined above, at least some of the sensors and/or actuators may be accessed via so-called control devices, which may be field control devices or programmable logic controllers being configured to control an aspect of the machinery. For example, the one or more control devices may be configured to run a control loop as part of the machinery, with the control loop being based on the status data provided by the sensor(s) and/or actuator(s) coupled with the respective control device(s). In some examples, the one or more control devices may further use additional input for the control loop(s) being run by the one or more control devices. This additional input may be generated and provided by the remote server, or by the edge controller. In other words, the processing circuitry may be configured to obtain instructions for controlling the one or more control devices (e.g., the additional input) from the remote server in response to the updated at least one model, and to control the one or more control devices based on the instructions obtained in response to the updated at least one model. Alternatively, or additionally, the processing circuitry may be configured to process the updated at least one model locally at the edge controller apparatus, and to control the one or more control devices (e.g., by providing the additional input for the control loop) based on the local processing of the updated at least one model being performed by the edge controller apparatus. In general, the remote server may have additional computational capabilities (and more overall knowledge of the industrial process) for processing the updated at least one model, at the cost of variances in the communication and/or the chance of connection loss, while the edge controller apparatus can leverage the more direct connection with the one or more control devices to more reliably provide the instructions, at the cost of less computational resources (and less overall knowledge of the industrial process) being available. For example, complex machine-learning models may be employed by the remote server to generate the instructions, while the instructions generated by the edge controller apparatus may be rule-based. In some examples, the instructions generated by the edge controller apparatus may be used as a fallback option in case the instructions of the remote server do not arrive in time (e.g., due to a communication failure).

While major parts of industrial plants (and of the machinery thereof) are controlled automatically using control loops and algorithms, manual involvement is sometimes needed or desired. For this purpose, a human operator may be provided with suitable information, which would enable them to safely control the industrial plant. The edge controller apparatus may be used to provide such information. For example, the processing circuitry may be configured to provide a user interface via the at least one interface, with the user interface comprising a representation of the at least one model. For example, the processing circuitry may be configured to generate a graphical representation of the at least one model, to generate a display signal comprising the graphical representation of the at least one model, and to provide the display signal to a display device (e.g., a display device located at a plant). Additionally, or alternatively, the processing circuitry may be configured to generate the graphical representation of the at least one model, and to provide the graphical representation via a web server being executed by the processing circuitry (or by another entity). Alternatively, or additionally, the processing circuitry may be configured to generate an audio representation of the at least one model (e.g., of information on an alarm condition or an anomaly condition included in the at least one model), and to output the audio representation via a loudspeaker.

In the aforementioned example, the focus has been on the functionality of a single edge controller apparatus. In some examples, additional functionality may be provided in the interaction of multiple edge controller apparatuses. FIGS. 1d and 1e show block diagrams of systems comprising two or more edge controller apparatuses. In FIGS. 1d and 1e, two different scenarios are shown.

In FIG. 1d, a scenario is shown where status data (e.g., pre-processed status data, raw status data and/or derived data) is exchanged between two edge controller apparatuses. In other words, the processing circuitry of a first 10a of the two or more edge controllers may be configured to obtain a subset of the plurality of units of status data (e.g., pre-processed status data, raw status data and/or derived data) via a second 10b of the two or more edge controllers. Thus, multiple edge controller apparatuses may share the load of maintaining and updating different models based on different sets of sensors and/or actuators, with units of status data being used by multiple edge controller apparatuses being passed among the multiple edge controller apparatuses.

In FIG. 1e, a scenario is shown where one (10c, further denoted "primary") of the edge controller apparatuses is used as a redundant copy of another (10a, further denoted "redundant") of the edge controller apparatuses. In other words, one 10c of the two or more edge controllers operates as a redundant copy of another 10a of the two of more edge controllers. In this case, the primary and the redundant edge controller apparatus may independently obtain the units of status data and independently update the at least one model. Alternatively, or additionally, as shown by the arrow between edge controller 10a and its redundant copy edge controller 10c, the state of the primary edge controller apparatus may be synchronized onto the redundant edge controller apparatus. In this case, the redundant edge controller can take over obtaining the status data after it has taken over. As a default, the updated model may be provided by the primary edge controller apparatus. If the primary edge controller apparatus fails, the updated model may be provided by the redundant edge controller apparatus.

The at least one interface 12 may correspond to one or more inputs and/or outputs for receiving and/or transmitting information, which may be in digital (bit) values according to a specified code, within a module, between modules or between modules of different entities. For example, the at least one interface 12 may comprise interface circuitry configured to receive and/or transmit information. For example, the at least one interface 12 may be configured to communicate via Ethernet or via another wire-bound or wireless communication channel.

For example, the processing circuitry 14 may be implemented using one or more processing units, one or more processing devices, any means for processing, such as a processor, a computer or a programmable hardware component being operable with accordingly adapted software. In other words, the described function of the processing circuitry 14 may as well be implemented in software, which is then executed on one or more programmable hardware components. Such hardware components may comprise a general-purpose processor, a Digital Signal Processor (DSP), a micro-controller, etc.

For example, the storage device 16 may comprise at least one element of the group of a computer readable storage medium, such as a magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

The edge controller apparatus may be a computing device, such as an (embedded) computer, or be hosted by such a computing device. For example, the edge controller apparatus may be implemented on top of a COTS (Commodity Off-The-Shelf) operating system being executed on a computing device. For example, the functionality of the edge controller apparatus may be implemented using a virtual machine being executed on top of a hypervisor being provided by a computing device.

More details and aspects of the edge controller apparatus, edge controller method, computer program and system are mentioned in connection with the proposed concept, or one or more examples described above or below (e.g., FIG. 2a to 2b). edge controller apparatus, edge controller method, computer program and system may comprise one or more additional optional features corresponding to one or more aspects of the proposed concept, or one or more examples described above or below.

Various examples of the present disclosure relate to an edge controller, a system and methods that can be used to perform (e.g., provide) acquisition, industrial process control functionality, storage, logic processing, calculating, aggregating, normalization and contextualization of industrial process data in the field of industrial operational technology and edge computing. The proposed edge controller and system may combine the functionality of an industrial internet of things (IIoT) device, run process control algorithms such as closed-loop control, provide intelligent processing to determine significant events within the system such as value changes and alarm conditions, aggregate and store this data and make it available to other systems in the domain and for additional processing in the cloud (i.e., by a remote server). For example, the proposed concept may relate to the fusion (i.e., combination) of a CI (Collaborative Information) server and the functionality of a field control station or high-performance PLC (Programmable Logic Controller) on a single device (i.e., the edge controller apparatus).

In the proposed concept, edge devices, such as the edge controller apparatus, may provide aggregation functions and local processing as well as pre-processing data before providing it to cloud servers. By combining these functions with components responsible for field data acquisition and an interface to a cloud environment, the proposed edge controller apparatus may enable providing data processing facilities at the point of acquisition. These functions can be used to provide data for the immediate benefit of local functions, such as local monitoring or other local systems external to the device. This is in addition to the benefits of the cloud interface used in some other concepts.

Relative to cloud processing only-approaches, the proposed concept may enable the provision of data to other systems in geographical or logical proximity. For example, in large and geographically dispersed environments, where network reliability may be an issue, local monitoring and data processing can be performed on the edge controller to provide service to other external local functions.

In many cases, the proposed concept may improve the accuracy of aggregated and calculated data. For example, the accuracy of some calculation and aggregation functions may depend on timely availability of raw data. This is especially true for time-sensitive aggregations such as averaging methods that depend on accurate, periodic provision of data samples. By combining the data acquisition and aggregation functions in a single device (i.e., the edge controller apparatus), there is a reduced or no risk of aggregated and calculated data being lost as a result of interruption of network transmissions to a central storage. Although approaches exist for mitigating loss of network connection, such as data buffering and backfilling of data, they may be limited by the capacity of physical storage space and/or maximum tolerated time the connection can be lost. There are no such limitations if acquisition and aggregation take place on the same device.

In some implementations, the proposed concept may also be used to perform normalization of semantically common data to a well-defined format. In many cases, the format and types of data acquired from field devices (e.g., sensors, actuators and/or control devices) can differ due to different characteristics of the field device, the vendor, and the types of data acquisition protocols used. Data processing on the edge controller can be used to normalize data that is common with respect to semantics (i.e., information content), but different in format or type due to the above differences. This is easy to perform on a system that is close to the original data source, where information about the data source is directly available and translation is possible. If data first has to be transferred to the cloud, then the cloud environment is responsible for understanding where the data came from and formatting it in the correct way. This requires either providing metadata about the source with each set of data transferred to the cloud, or retroactively applying context to data already in the cloud. Both of these present a challenge when cloud environments are typically processing large data sets from many different sources. Normalizing data into a common format at the edge controller can offload this work from the cloud by preprocessing data before it is transmitted.

Various examples of the present disclosure may further perform contextualization of data. Cloud environments (e.g., the remote server) typically have to process large data sets from different sources. This creates a challenge in being able to correlate data if information about what that data means and to what it relates is not readily available. For example, measuring and comparing performance of manufacturing components of the same type or vendor across multiple sites is only possible if information identifying the component is available. When only raw data values are sent directly to the cloud, it can be challenging to determine where that data came from and what it means, in particular if there is no metadata provided by the source. In other concepts, the data in the cloud might need to be retroactively contextualized and organized before it can be used in cloud applications. The edge controller can add context in the form of organization, hierarchy, and metadata, describing what the data means and its relationship to other data. This can reduce or eliminate the necessity to perform contextualization retroactively at cloud level.

In addition, the edge controller may perform data validation and evaluate the relevance of data. In some other concepts, data processing is performed completely in the cloud and all data has to be provided before it can be checked whether it is useful for further processing by cloud applications. By performing validation and filtering of raw data on the edge controller before it is sent to the cloud, (only) relevant data required by the cloud application might be provided, thus relieving the cloud application of having to sanitize data over potentially large data sets. This may also reduce the amount of data sent over the network, which can reduce the utility costs associated with using a cloud provider.

Figure 2A:
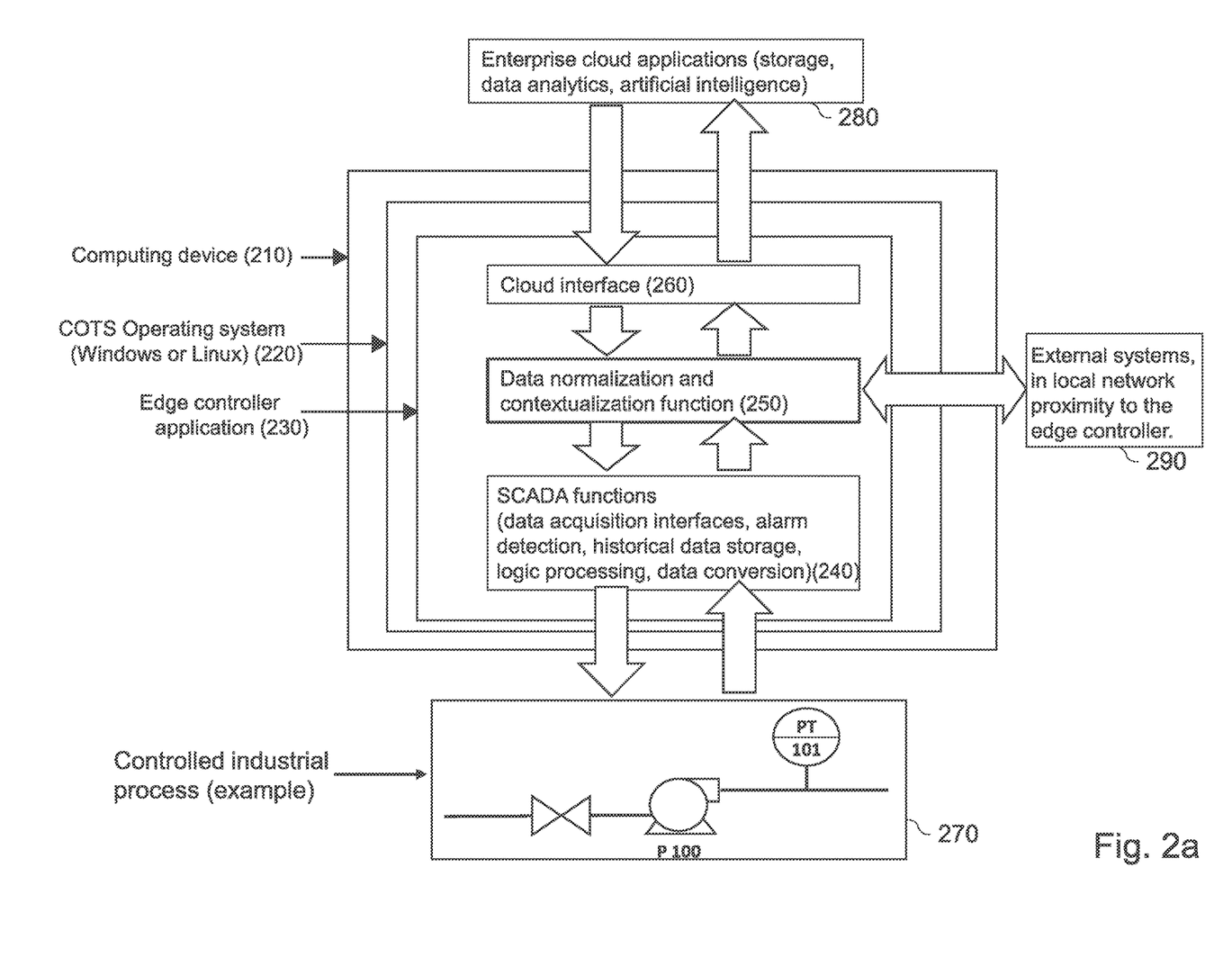
FIG. 2a shows a schematic diagram of an example of system functions and their relationship.
Figure 2B:
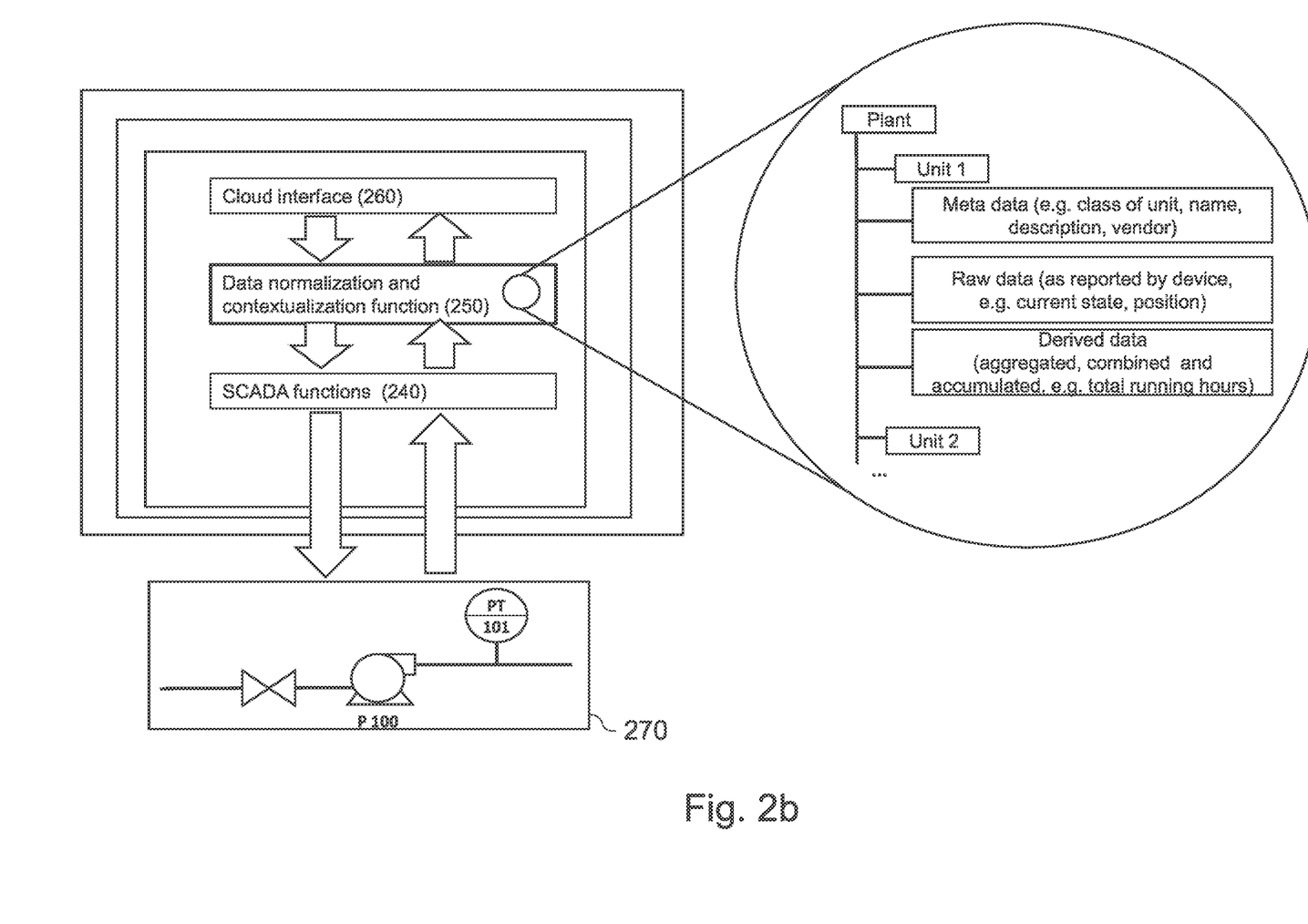
FIG. 2b shows a schematic diagram of an example of a data model and of the contextualization of plant data.

FIG. 2a shows a schematic diagram of an example of system functions and their relationship. In an example implementation, shown in FIG. 2a, the proposed edge controller (and system) may comprise (or be composed of) a computing device 210 containing a processor, memory, solid-state or rotating disk storage, two or more Ethernet network interfaces, an optional USB (Universal Serial Bus) interface and an optional serial communications (RS (Recommended Standard) 232 and/or RS485) interface. The edge controller/system may comprise a COTS (Commodity Off-The-Shelf) operating system 220 may be run (i.e., executed) on the computing device to manage memory, storage, and network interfaces, and make these resources available to an edge controller application 230. The operating system may contain drivers for interfacing with field devices via the communications interfaces of the computing device, sending data as control values and receiving (status) data as measured values. The edge controller/system may comprise an edge controller application 230 comprising logic and data processing functions. The edge controller application 230 may run on the computing device COTS operating system 220. For example, the edge controller application 230 may comprise a SCADA function 240 for acquiring measured values using industry standard communication protocols via the communication interfaces included in the computing device 210, sending values to field devices (of the controlled industrial process 270) over the same interfaces, e.g., for one or more of control purposes, detecting, storing and annunciating alarm events, storing measured values in time-order for the purposes of generating reports and trends, generating calculated and aggregated values from measured values that can be stored, reported or used as output values for control. The SCADA function 240 may process the raw (status) data being received from field devices and send control values to the field devices. For example, the edge controller application 230 may comprise a normalization and contextualization function 250 for standardizing the format and range of measured values and provision of structure and metadata to describe the source, purpose, and relationships of the data (e.g., the contextual information), e.g., with respect to external systems 290 in local network proximity to the edge controller, e.g., as part of the at least one model. For example, the edge controller application 230 may comprise a cloud interface function 260 for sending data acquired and processed by the edge controller application over the internet to the cloud (e.g., to enterprise cloud applications (storage, data analytics, artificial intelligence) 280), and for receiving data from the cloud to be consumed by the edge controller application.

FIG. 2b shows a schematic diagram of an example of a data model and of the contextualization of plant data. As shown in FIG. 2b, the data normalization and contextualization function 250 may maintain an abstract view of the plant as a data model (e.g., the at least model model) and information hierarchy in terms of real-world objects. In the example shown in FIG. 2b, the plant comprises a first unit (unit 1), which may comprise meta data (e.g., the class of the unit, name, description, and vendor), which may comprise contextual information, raw data (as reported by the device, e.g., the current state and the position) and/or derived data (e.g., aggregated, combined, and accumulated data, e.g., total running hours). The latter two types of data may correspond to status data included in the respective model. The plant further comprises a second unit (unit 2), which may include the same or similar kinds of data. The cloud interface 260 may provide data to a cloud application (being hosted by a remote server), in terms of the data model provided by data normalization and contextualization function, not raw field data.

In some implementations, the core of the proposed concept may be implemented by the edge controller apparatus 230, the SCADA function 240 and the normalization and contextualization function 250. The computing device 210 and COTS OS may be provisioned separately to provide the platform on which the system runs. It is also possible that these components are facilitated through a virtualized computing environment, rather than a physical computing device. In some examples, the system can operate without a cloud interface 260, providing only contextualized data to users and external systems in local network proximity. However, the main benefit of the system may be to provide contextualized data to cloud applications For example, the normalization and contextualization function 250 may be configured to organize the data from the SCADA function so that the (status) data is organized in such a way that it represents an abstraction of the logical function of a field device or collection of field devices in terms of their measured values, control values and calculated or aggregated values (which may be types of status data), independent and regardless of the physical connections and interfaces required to connect to them. For example, the normalization and contextualization function 250 may be configured to organize the data such that devices that share commonality of logical function and data can be processed in a common way, by defining a class of device containing the common logic, data, and representation, such that devices of the same class can share identical data processing and execution of logic. The normalization and contextualization function 250 may be configured to perform calculations and aggregations on the raw measured values to generate additional data that provide derived data such as total production measurements, device performance, current and projected state and direction of the process, and any other derivations that improve overall insight into the process performance. For example, the normalization and contextualization function 250 may be configured to supplement the organized data with metadata (e.g., contextual information) to provide unique identification for each logical device or collection of devices, describe its purpose, location, and other attributes for the purpose of classification and correlation, as required by the cloud services.

Implementation of the normalization and contextualization function may be facilitated using (e.g., based on) open standards. The IEC (International Electrotechnical Commission) standard 62541 describes the OPC Unified Architecture. The OPC Unified Architecture describes a (standard) method for defining data models and making them discoverable and accessible to client applications. The abstraction of the data model representing field devices and their relationships, as well as the supplementing of metadata may be implemented according to this standard. The standard does not define how information should be acquired by the model or how it is processed, therefore class logic, calculations and aggregation functions may be implemented independently.

The cloud interface function 260 may be configured to translate data from the normalization and contextualization function 250 into a message format (i.e., to generate data packets and/or the payload for data packets) that can be sent over the network and consumed by the cloud service. In other words, the cloud interface function may be configured to determine updates to the at least one model, and to transmit the entire updated model, or the updated portions of it, to the cloud service. To bring it into perspective—the SCADA function 240 may collect the data that is used to update the model, the normalization and contextualization function 250 may contain the model and perform the normalization and contextualization outlined above, and the cloud interface function 260 may identify the updates to the model and transmit the updates (or the entire model) to the cloud service if the updates justify the data transmission. In addition, it may have one or more of the following functions. For example, the cloud interface function 260 may be configured to reduce data being transferred to the cloud by application of data value change thresholds (e.g., to avoid transmissions of changes of status data that deviates at most the data value change threshold from the previous submission). In other words, the cloud interface function 260 may be configured to filter out irrelevant units of status data. Additionally, or alternatively, the cloud interface function 260 may be configured to filter of data relevant to the cloud applications based on organizational structure and metadata managed by the normalization and contextualization function. In other words, the cloud interface function 260 may be configured to include status data in the at least one model according to the relevance of the respective status data for the cloud applications. Additionally, or alternatively, the cloud interface function 260 may be configured to receive data from the cloud services for consumption by the normalization and contextualization function in the edge controller, such as data resulting from analytical calculations or artificial intelligence applications in the cloud. This can in turn be provided to the SCADA function for data processing and control. In other words, the cloud interface function 260 may be configured to receive processed status data and/or instructions for controlling the one or more control devices from the cloud (i.e., the remote server). For example, the cloud interface function 260 may be configured to maintain availability of data from the edge controller in case of loss of network connection with the cloud by facilitating storage and backfilling of data for later transmission upon restoration of network connection.

In some implementations, e.g., as shown in FIG. 1c, multiple edge controllers may be used in parallel, e.g., to enable controller redundancy. For example, the edge controller may be configured in a dual redundant configuration for the purpose of availability. This mode may employ two instances of the edge controller with identical hardware and software configurations, with one member of the pair performing data processing functions (active controller) and the other member of the pair being synchronized at runtime with the current state from the active controller (standby). In case of hardware or software failure on the active server, the standby controller can take over the role of active controller. As shown in FIG. 1d, multiple edge controllers, e.g., edge controllers not linked for redundancy purposes, may also communicate for the purpose of exchanging (status) data obtained from the sensors and/or actuators, e.g., to enable acquisition of data from other edge controllers. For example, in addition to acquiring data from an industrial process, an edge controller can interface with other edge controllers, e.g., within the same logical network layer. This may allow data processing in the edge controller using (status) data acquired directly from the industrial process as well as from other edge controllers connected to other regions of the same process or separate industrial processes (e.g., machinery). In this configuration, one edge controller can act as a gateway or concentrator to the cloud applications, simplifying application configuration and network security configuration.

In various examples, the proposed edge controller may perform local processing. Through local processing, the edge controller may not be dependent on the cloud environment to be able to operate. Data acquisition, monitoring and control functions associated with a SCADA application can be run on the edge controller. Additionally, or alternatively, local monitoring may be performed. Graphical user interface functions may be run directly on the edge controller, in order to provide process visualization and control functions for a human operator.

In addition, network redundancy may be provided. For example, network interfaces to the controlled process (e.g., the sensors, actors and/or control devices) as well as connections to the cloud (i.e., the remote server) can be applied redundantly for the purpose of increasing availability. In case the current network interface experiences a hardware or network communication failure, the redundant network interface can take over this role.

More details and aspects of the edge controller and system are mentioned in connection with the proposed concept, or one or more examples described above or below (e.g., FIG. 1a to 1e). The edge controller and/or the system may comprise one or more additional optional features corresponding to one or more aspects of the proposed concept, or one or more examples described above or below.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An edge controller method comprising:
    obtaining a plurality of units of status data of a plurality of sensors or actuators, the plurality of sensors or actuators being part of machinery or being arranged in an environment of the machinery;
    updating at least one model representing the status of the sensors or actuators based on the plurality of units of status data, wherein the model is a data structured representation that is filled with the plurality of units of status data and/or data derived from the plurality of units of status data and are converted into a pre-defined data format; and
    providing the updated at least one model representing the status of the sensors or actuators to a remote server,
    wherein the units of status data are normalized by converting the units of status data into a sensor-agnostic data format or an actuator-agnostic data format mandated by the at least one model and the at least one model is updated based on the normalized units of status data.

2. A non-transitory, computer-readable medium comprising a program code that, when the program code is executed on a processor, a computer, or a programmable hardware component, causes the processor, computer, or programmable hardware component to perform the method of claim 1.

3. An edge controller apparatus comprising:
at least one interface for obtaining status data of a plurality of sensors or actuators and for communicating with a remote server; and
processing circuitry configured to:
obtain a plurality of units of status data of the plurality of sensors or actuators, the plurality of sensors or actuators being part of machinery or being arranged in an environment of the machinery,
update at least one model representing the status of the sensors or actuators based on the plurality of units of status data and contextual information, wherein the model is a data structured representation that is filled with the plurality of units of status data and/or data derived from the plurality of units of status data and are converted into a pre-defined data format, and
provide the updated at least one model representing a status of the sensors or actuators to the remote server, wherein the processing circuitry is configured to normalize the units of status data by converting the units of status data into a sensor-agnostic data format or an actuator-agnostic data format mandated by the at least one model and update the at least one model based on the normalized units of status data.

4. The edge controller apparatus according to claim 3, wherein the processing circuitry is configured to include contextual information in the at least one model, by updating each model based on at least two units of status data, or by updating each model based on at least one unit of status data if the respective model comprises contextual information on the sensor or actuator the at least one unit of status data originates from.

5. The edge controller apparatus according to claim 4, wherein, if the model is updated based on at least two units of status data, the contextual information is based on one of the at least two units of status data.

6. The edge controller apparatus according to claim 3, wherein the processing circuitry is configured to obtain a subset of the plurality of units of status data from one or more additional sensors.

7. The edge controller apparatus according to claim 1, wherein the processing circuitry is configured to update the at least one model based on an update frequency mandated by the respective model, with the update frequency being independent of an update frequency of the respective units of sensor data.

8. The edge controller apparatus according to claim 1, wherein the processing circuitry is configured to aggregate status data of the same sensor and/or actuator over multiple points in time and to update the at least one model based on the aggregated status data.

9. The edge controller apparatus according to claim 1, wherein the processing circuitry is configured to calculate derived data from the plurality of units of status data, and to include the derived data in the at least one model.

10. The edge controller apparatus according to claim 1, wherein the processing circuitry is configured to validate the units of status data, and to update the at least one model based on the validated units of status data.

11. The edge controller apparatus according to claim 1, wherein the processing circuitry is configured to filter out irrelevant units of status data based on a relevancy criterion, and to update the at least one model based on the remaining units of status data.

12. The edge controller apparatus according to claim 1, wherein the processing circuitry is configured to obtain the respective status data from one or more control devices, such as field control devices and/or programmable logic controllers, being coupled with the respective sensors or actuators.

13. The edge controller apparatus according to claim 12, wherein the processing circuitry is configured to obtain instructions for controlling the one or more control devices from the remote server in response to the updated at least one model, and to control the one or more control devices based on the instructions obtained in response to the updated at least one model.

14. The edge controller apparatus according to claim 12, wherein the processing circuitry is configured to process the updated at least one model locally at the edge controller apparatus, and to control the one or more control devices based on the local processing of the updated at least one model being performed by the edge controller apparatus.

15. The edge controller apparatus according to claim 1, wherein the processing circuitry is configured to provide a user interface via the at least one interface, the user interface comprising a representation of the at least one model.

16. A system comprising two or more edge controller apparatuses according to A system comprising two or more edge controller apparatuses according to wherein the processing circuitry of a first of the two or more edge controllers is configured to obtain a subset of the plurality of units of status data via a second of the two or more edge controllers, or wherein one of the two or more edge controllers operates as a redundant copy of another of the two of more edge controllers.

* * * * *